US009262733B2

(12) United States Patent  
Iwamoto et al.

(10) Patent No.: US 9,262,733 B2  
(45) Date of Patent: Feb. 16, 2016

(54) JOB SUPPORTING APPARATUS, PORTABLE TERMINAL AND JOB SUPPORTING METHOD

(71) Applicant: TOSHIBA TEC KABUSHIKI KAISHA, Shinagawa-ku, Tokyo (JP)

(72) Inventors: Natsuko Iwamoto, Kanagawa-ken (JP); Katsuyuki Suzuki, Shizuoka-ken (JP); Shunichiro Kawamoto, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 409 days.

(21) Appl. No.: 13/780,202

(22) Filed: Feb. 28, 2013

(65) Prior Publication Data  
US 2013/0238376 A1 Sep. 12, 2013

(30) Foreign Application Priority Data

Mar. 6, 2012 (JP) ................................. 2012-049710

(51) Int. Cl.  
G06Q 10/00 (2012.01)  
G06Q 10/06 (2012.01)

(52) U.S. Cl.  
CPC ................................. G06Q 10/06311 (2013.01)

(58) Field of Classification Search  
None  
See application file for complete search history.

(56) References Cited

U.S. PATENT DOCUMENTS

| 7,004,389 | B1 * | 2/2006 | Robinson et al. ............. 235/382 |
| 7,630,986 | B1 * | 12/2009 | Herz et al. |
| 8,417,442 | B2 * | 4/2013 | Johnson et al. ............... 701/118 |
| 9,020,848 | B1 * | 4/2015 | Ridge et al. ...................... 705/32 |
| 2002/0026348 | A1 * | 2/2002 | Fowler et al. ................... 705/10 |
| 2003/0233278 | A1 * | 12/2003 | Marshall .......................... 705/14 |
| 2005/0021428 | A1 * | 1/2005 | Costello .......................... 705/32 |
| 2005/0197954 | A1 * | 9/2005 | Maitland et al. ................ 705/39 |
| 2006/0161469 | A1 * | 7/2006 | Root et al. ........................ 705/9 |
| 2007/0043811 | A1 * | 2/2007 | Kim et al. ...................... 709/203 |
| 2007/0173993 | A1 * | 7/2007 | Nielsen et al. .................. 701/35 |

(Continued)

FOREIGN PATENT DOCUMENTS

| JP | 09-113599 | 5/1997 |
| JP | 2002-350170 | 12/2002 |

(Continued)

OTHER PUBLICATIONS

Office Action of Notice of Rejection for Japanese Patent Application No. 2012-049710 Dated Jan. 28, 2014, 5 pgs.

*Primary Examiner* — Gurkanwaljit Singh  
(74) *Attorney, Agent, or Firm* — Amin, Turocy & Watson, LLP

(57) ABSTRACT

A job supporting apparatus comprises a management section configured to manage a job schedule, containing a predetermined job content to be carried out by a person in charge and a work position at which the job content is performed, that is associated with respective portable terminal carried by each person in charge, a position specifying section configured to specify the position of the portable terminal, a first extracting section configured to extract a job schedule containing a work position corresponding to the location of the portable terminal specified by the position specifying section from the job schedules associated with the portable terminals, and a first notifying section configured to notify the job schedule extracted by the first extracting section to a portable terminal associated with the extracted job schedule.

5 Claims, 9 Drawing Sheets

(56) References Cited

U.S. PATENT DOCUMENTS

| | | | |
|---|---|---|---|
| 2007/0250370 A1* | 10/2007 | Partridge et al. | 705/8 |
| 2008/0207183 A1* | 8/2008 | Root et al. | 455/414.2 |
| 2008/0319918 A1* | 12/2008 | Forlai | 705/80 |
| 2009/0076925 A1* | 3/2009 | DeWitt et al. | 705/26 |
| 2009/0240554 A1* | 9/2009 | Oswald et al. | 705/9 |
| 2010/0030644 A1* | 2/2010 | Dhamodharan | 705/14.49 |
| 2010/0063830 A1* | 3/2010 | Kenedy et al. | 705/1 |
| 2010/0063843 A1* | 3/2010 | Kenedy et al. | 705/3 |
| 2010/0063930 A1* | 3/2010 | Kenedy et al. | 705/51 |
| 2011/0202402 A1* | 8/2011 | Fowler et al. | 705/14.25 |
| 2011/0258049 A1* | 10/2011 | Ramer et al. | 705/14.66 |
| 2012/0066019 A1* | 3/2012 | Hinshaw et al. | 705/7.23 |
| 2012/0330701 A1* | 12/2012 | Hyder et al. | 705/7.11 |
| 2012/0330856 A1* | 12/2012 | Hyder et al. | 705/321 |
| 2013/0073366 A1* | 3/2013 | Heath | 705/14.25 |
| 2013/0073473 A1* | 3/2013 | Heath | 705/319 |
| 2013/0090968 A1* | 4/2013 | Borza | 705/7.16 |

FOREIGN PATENT DOCUMENTS

| | | |
|---|---|---|
| JP | 2006-238134 | 9/2006 |
| JP | 2006-268585 | 10/2006 |
| JP | 2010-231703 | 10/2010 |

* cited by examiner

FIG.3

| AP IDENTIFIER | ARRANGEMENT POSITION |
|---|---|

FIG.4

| NURSE IDENTIFIER | TERMINAL IDENTIFIER | JOB SCHEDULE | | | STATE FLAG | OPERATOR |
|---|---|---|---|---|---|---|
| | | JOB STARTING TIME | JOB CONTENT | JOB POSITION | | |

JOB SUPPORTING APPARATUS, PORTABLE TERMINAL AND JOB SUPPORTING METHOD

CROSS-REFERENCE TO RELATED APPLICATION

This application is based upon and claims the benefit of priority from Japanese Patent Application No. 2012-049710, filed Mar. 6, 2012, the entire contents of which are incorporated herein by reference.

FIELD

Embodiments described herein relate to a job supporting apparatus, a portable terminal and a job supporting method.

BACKGROUND

Conventionally, a practitioner such as a nurse performs a his/her work while confirming a table of previously prepared job schedule on a paper medium or on a PDA (Personal Digital Assistant) terminal. Moreover, there is known a technology in which a person inputting a his/her schedule including an event and a scheduled time thereof is informed of the event when the scheduled time comes.

BRIEF DESCRIPTION OF THE DRAWINGS

FIG. 3 is a diagram illustrating an example of the data structure of an AP management file shown in FIG. 2;

FIG. 4 is a diagram illustrating an example of the data structure of a job schedule management file shown in FIG. 2;

DETAILED DESCRIPTION

In accordance with an embodiment, a job supporting apparatus comprises a management section configured to manage a job schedule, containing a predetermined job content to be carried out by a person in charge and a work position at which the job content is performed, that is associated with respective portable terminal carried by each person in charge, a position specifying section configured to specify the position of the portable terminal, a first extracting section configured to extract a job schedule containing a work position corresponding to the location of the portable terminal specified by the position specifying section from the job schedules associated with the portable terminals, and a first notifying section configured to notify the job schedule extracted by the first extracting section to a portable terminal associated with the extracted job schedule.

Embodiments of the job supporting apparatus, a portable terminal and a job supporting method are described below in detail with reference to the accompanying drawings. Besides, although examples described hereinafter are applied to a nursing job support system supportive to the nursing work, the present invention is not limited to those embodiments.

Figure 1:
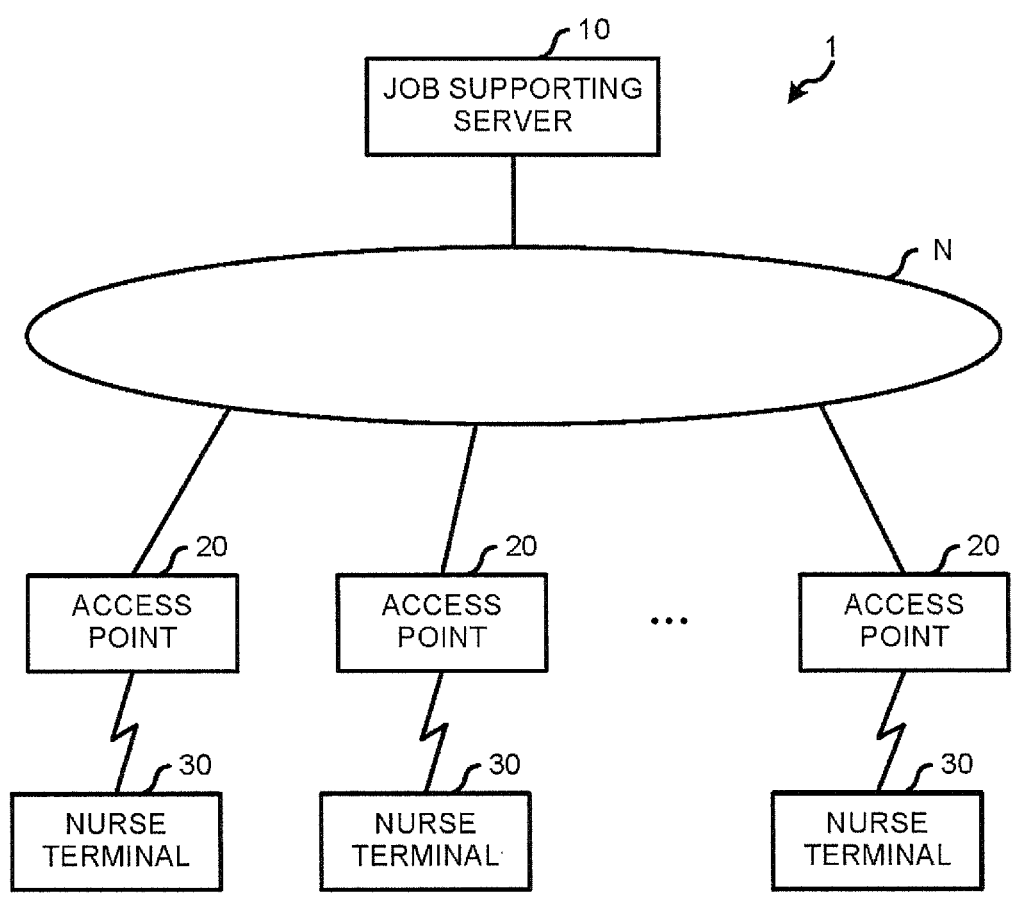
FIG. 1 is a schematic diagram illustrating the structure of a nursing job supporting system according to an embodiment.

FIG. 1 is a schematic diagram illustrating the structure of a nursing job supporting system 1 according to the present embodiment. As shown in FIG. 1, a nursing job supporting system 1 comprises a job supporting server 10 serving as a job supporting apparatus, access points 20 and nurse terminals 30 respectively serving as a portable terminal carried by a nurse. The access points 20, through which the job supporting server 10 is connected with the nurse terminals 30, are connected with a network N such as an intranet. No specific limitation is given to the number of the access points 20 or the nurse terminals 30 constituting the nursing job supporting system 1.

The job supporting server 10 refers to one or more server apparatuses having the function of a Web server or an application server, which provides various information to the nurse terminals 30 connected therewith through the access points 20.

Figure 2:
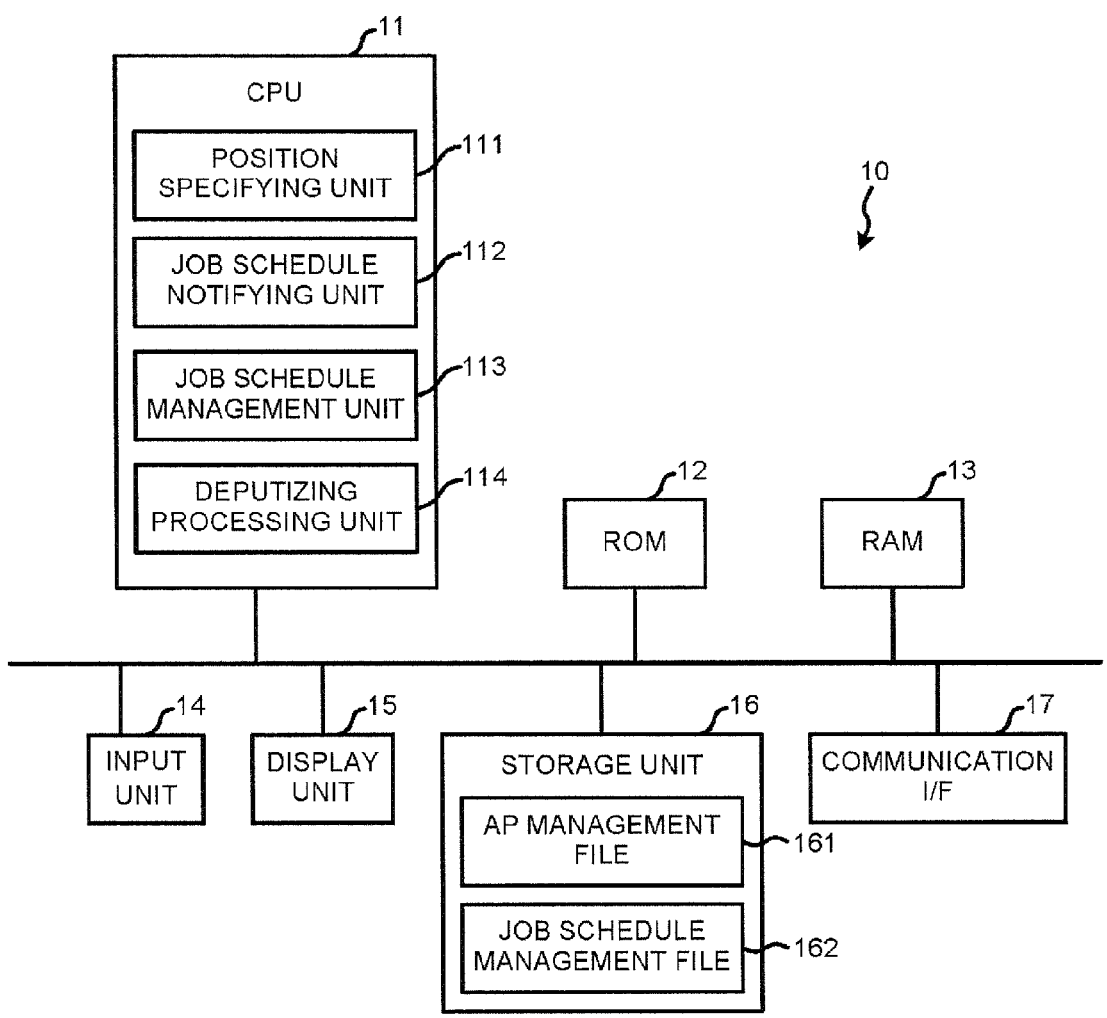
FIG. 2 is a diagram illustrating an example of the structure of the job supporting server shown in FIG. 1.

FIG. 2 is a diagram illustrating an example of the structure of the job supporting server 10. As shown in FIG. 2, as a micro computer for executing information processing, the job supporting server 10 comprises a CPU 11, a ROM 12 and a RAM 13.

The CPU 11 collectively controls operations of the job supporting server 10 by executing programs stored in the ROM 102 and a storage unit 16 described later. The ROM 12 stores programs for executing basic operations. The RAM 13 is a main storage device for the job supporting server 10, which functions as the working area of the CPU 11.

Further, the CPU 11 is connected with an input unit 14 and a display unit 15 via various input-output circuits (not shown). The input unit 14 is an input device such as a keyboard or a pointing device which notifies the CPU 11 of the operation content input by the operator for the job supporting server 10. The display unit 15 is a display device having an LCD which displays various information in accordance with the instruction of the CPU 11.

The CPU 11 is connected with the storage unit 16 and a communication I/F 17 via various input-output circuits (not shown).

The storage unit 16 is a memory medium such as an HDD or a flash memory for storing programs for realizing operations of the job supporting server 10 and, various files. For example, the files stored in the storage unit 16 may be an AP management file 161 in which the arrangement position of each access point 20 is stored, and a job schedule management file 162 for managing the job schedule of each nurse.

FIG. 3 is a diagram illustrating an example of the data structure of the AP management file 161. As shown in FIG. 3, the AP management file 161 includes, as a data items, an 'AP identifier' and an 'arrangement position', which are associated with each other for management.

An identifier (sensor identifier) for identifying each access point 20 is set in the 'AP identifier'. For example, the AP identifier may be an IP address, a MAC address or an individual device number previously assigned to each access point 20. An arrangement position or setting position of a corresponding access point 20 is set in the 'arrangement position'. The arrangement position may be, for example, a ward number at which an access point 20 is arranged, a facility name and the coordinate of a position within the hospital. The data structure of the AP management file 161 is not limited to the example shown in FIG. 3.

FIG. 4 is a diagram illustrating an example of the data structure of the job schedule management file 162. As shown in FIG. 4, the job schedule management file 162 includes, as a data items, a 'nurse identifier', a 'terminal identifier, a 'job schedule', a 'state flag' and an 'operator', which are associated with each other for management.

An identifier (nurse identifier) for identifying a nurse is set in the 'nurse identifier'. The nurse identifier may be, for example, name of a nurse or a nurse ID previously assigned to a nurse. An identifier (terminal identifier) for identifying a nurse terminal 30 carried by a nurse in charge is set in the 'terminal identifier'. For example, the terminal identifier may be an IP address, a MAC address or an individual device number previously assigned to a nurse terminal 30.

A scheduled job to be executed by a nurse in charge within a given time (e.g. 2 hours or 1 day) is set in the 'job schedule'. The data items contained in the 'job schedule' include 'job starting time', 'job content' and 'work position'. The time at which a scheduled job is started is set in the 'job starting time'. Content of the scheduled job, such as 'vital check' or 'medication', to be executed by a nurse in charge for a patient who receives such work (treatment) is set in the 'job content'. The ward number where the job is carried out, name of a facility for executing the job, and the coordinate of a position within the hospital where the job is executed are set in the 'work position'.

Flag information representing the state of a job schedule is set in the ' state flag'. In this embodiment, a binary numerals (0/1) are used as a flag information, by which one of the states including 'Working' and 'End of Work' is represented, for example. Further, the nurse identifier for indicating a nurse who actually carries out the job schedule is set in 'operator'. Besides, the 'state flag' and the 'operator' are null just after a job schedule is registered. That is, if the state flag is null, it represents that the job schedule is sill not carried out.

As shown in FIG. 2, the communication I/F 17 is an interface for connecting with the network N. The communication I/F 17 performs transmission/reception of various information with the nurse terminal 30 through each access point 20 connected with the network N.

Next, the distinctive functions of the job supporting server 10 are described below. The CPU 11 cooperates with the specific programs stored in the ROM 12 and the storage unit 16 to respectively realize functions of operation sections such as a position specifying section 111, a job schedule notifying section 112, a job schedule management section 113 and a substitution processing section 114, as show in FIG. 2.

The position specifying section 111 specifies, based on the AP identifier of the access point 20 used by the nurse terminal 30 performing access to the job supporting server, the position information associated with the AP identifier from the AP management file 161 as the position of the nurse terminal 30 of an access source.

The job schedule notifying section 112 extracts, from the job schedule management file 162, a job schedule specified by a group consisting of the terminal identifier of the nurse terminal 30 performing access to the job supporting server and the position of the nurse terminal 30 acquired by the position specifying section 111. Moreover, the job schedule notifying section 112 notifies (transmits) the job schedule extracted from the job schedule management file 162 to the nurse terminal 30 of the access source as an execution target candidate. Further, the job schedule having the state flag 'Working' or 'End of Work' stored in the job schedule management file 162 is excluded from the target of the extraction.

If the job schedule management section 113 receives an execution notice designating the execution of a specific job schedule from the nurse terminal 30, then the job schedule management section 113 sets a flag information representing 'Working' to the state flag of the specific job schedule, and registers the nurse identifier corresponding to the terminal identifier of the nurse terminal 30 sending the execution notice in the column 'operator' at the same time. Moreover, if the job schedule management section 113 receives an ending notice designating end of a specific job schedule from the nurse terminal 30, the job schedule management section 113 sets a flag information representing 'End of Work' to the state flag of the specific job schedule.

The substitution processing section 114 controls the substitution-doing for a job schedule between the nurse terminals 30 based on the AP management file 161 and the job schedule management file 162.

Specifically, the substitution processing section 114 extracts, from the job schedules associated with the terminal identifiers of another nurse terminals 30 different from the nurse terminal 30 specified by the position specifying section 111, a job schedule containing a work position corresponding to the position of the specified nurse terminal 30. In this embodiment a job schedule associated with the terminal identifier of another nurse terminal 30 different from the subject nurse terminal 30 is extracted based on the work position contained in a job schedule in which the state flag is "Working" within the job schedules relating to the position of the nurse terminal 30 specified by the position specifying section 111.

Moreover, the substitution processing section 114 notifies (transmits) each extracted job schedule to the nurse terminal 30 having a terminal identifier corresponding to the job schedule as a job substitution-doing candidate. Further, job schedule having a state flag 'Working' or 'End of Work' within the job schedules stored in the job schedule management file 162 is excluded from the target of the extraction.

Further, if the substitution processing section 114 receives a substitution-doing request containing a specific job schedule from a nurse terminal 30, then the substitution processing section 114 sends the substitution-doing request to a nurse terminal 30, which locates at the work position contained in the specific job schedule and the state flag of the job schedule thereof including the subject work position is "Working". At least a job schedule (content to be processed) subject to the substitution-doing is contained in the substitution-doing request. Further, if the job schedule management section 113 receives the execution notice of a job schedule to which the substitution-doing is requested from the nurse terminal 30 sending the substitution-doing request, the job schedule management unit 113 sets the state flag of the job schedule to 'Working'.

Next, the access point 20 is described. The access point 20 functions as an element of a wireless LAN and is connected with the network N. The access point 20 is arranged at each place in the hospital to communicate with the nurse terminal 30 nearby. Thus, the nurse terminal 30 is connected to be able to communicate, via the access point 20, with the job supporting server 10. When the nurse terminal 30 communicates with the job supporting server 10, the access point 20 sends the AP identifier thereof to the job supporting server 10.

The nurse terminal 30 is described below. The nurse terminal 30 is an information communication terminal carried by a nurse, such as a notebook personal computer, a tablet terminal or a handy terminal. A nurse uses a nurse terminal 30 by inputting a his/her nurse identifier to the nurse terminal 30. When communicating with the job supporting server 10 via the access point 20, the nurse terminal 30 sends the terminal identifier thereof and the nurse identifier input at first to the job supporting server 10.

Figure 5:
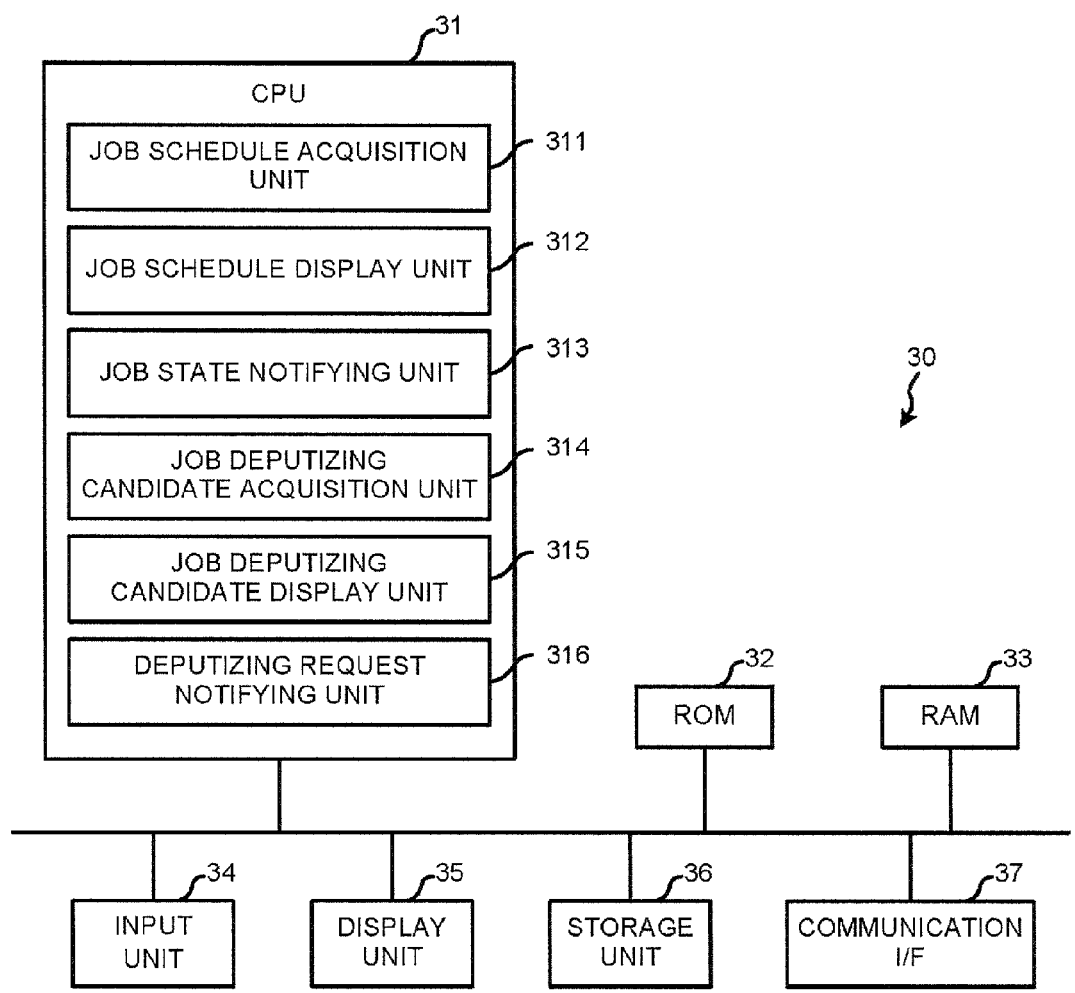
FIG. 5 is a diagram illustrating an example of the structure of a nurse terminal shown in FIG. 1.

FIG. 5 is a diagram illustrating an example of the structure of the nurse terminal 30. As shown in FIG. 5, the nurse terminal 30 comprises a CPU 31, a ROM 32 and a RAM 33, as a micro-computer for executing an information processing.

The CPU 31 collectively controls operations of the nurse terminal 30 by executing the programs stored in the ROM 32 and the storage unit 36 described later. The ROM 32 stores the programs for executing basic operations. The RAM 33 is a main storage device of the nurse terminal 30, which functions as a working area of the CPU 31.

Further, the CPU 31 is connected with an input unit 34 and a display unit 35 via various input-output circuits (not shown). The input unit 34 is an input device such as a keyboard or a pointing device which informs the CPU 31 of the operation content input by the operator of the nurse terminal 30. The display unit 35 is a display device having an LCD (Liquid Crystal Display) which displays various information in accordance with the instruction of the CPU 31. Further, the input unit 34 may be constituted as a touch panel to cooperate with the display unit 35 to accept an input.

Further, the CPU 31 is connected with the storage unit 36 and the communication I/F 37 via various input-output circuits (not shown). The storage unit 36 is a storage medium such as an HDD or a flash memory for storing programs such as a Web browser and various files. The communication I/F 37 is an interface connected with the access point 20 to carry out transmission/reception of various data with the job supporting server 10 via the access point 20. When communicating with the job supporting server 10, the communication I/F 37 sends the terminal identifier of the nurse terminal 30 in which the communication I/F 37 is mounted and the nurse identifier of the nurse who operates the nurse terminal 30 to the job supporting server 10.

Next, the distinctive functions of the nurse terminal 30 are described below. The CPU 31 realizes functional sections including a job schedule acquisition section 311, a job schedule display section 312, a job state notifying unit 313, a job substitution candidate acquisition section 314, a job substitution candidate display section 315 and a substitution-doing request notifying section 316 in cooperation with the programs stored in the ROM 32 and the storage section 36, as shown in FIG. 5.

The job schedule acquisition section 311 acquires the execution target candidate notified from the job supporting server 10, and also acquires a substitution-doing request notified from the job supporting server 10.

The job schedule display section 312 displays, on the display unit 35, the job schedule contained in the execution target candidate acquired by the job schedule acquisition section 311.

Figure 6:
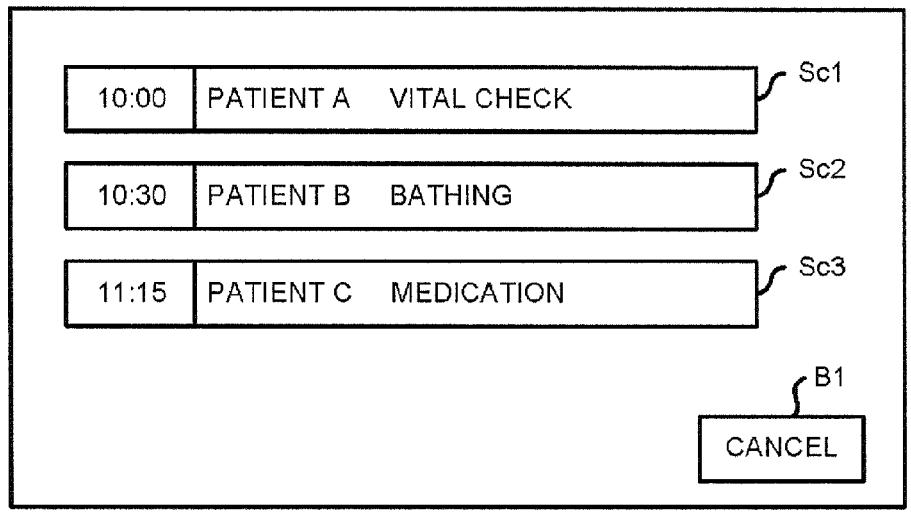
FIG. 6 is a diagram illustrating an example of an execution target candidate screen displayed on the display section of the nurse terminal.

FIG. 6 is a diagram illustrating an example of an execution target candidate screen displayed on the display unit 35 of the nurse terminal 30. As shown in FIG. 6, the job schedule display section 312 displays an execution target candidate screen on the display unit 35 to enable the selection of a job schedule from job schedules Sc1-Sc3 contained in the execution target candidate. The operator of the nurse terminal 30 selects a job schedule as an execution target through the input unit 34. Additionally, if a cancel button B1 is operated, the job schedule display section 312 clears or erases the execution target candidate screen displayed on the display unit 35.

The job schedule display section 312 displays, on the display unit 35, the job schedule contained in the substitution-doing request acquired by the job schedule acquisition section 311.

Figure 7:
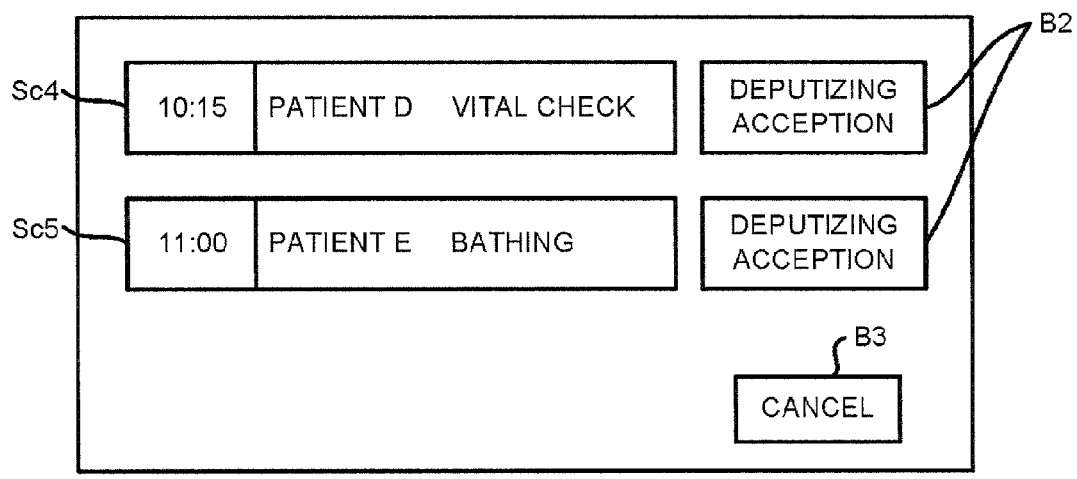
FIG. 7 is a diagram illustrating an example of a substitution request screen displayed on the display section of the nurse terminal.

FIG. 7 is a diagram illustrating an example of the substitution request screen displayed on the display unit 35 of the nurse terminal 30. As shown in FIG. 7, the job schedule display section 312 displays the job schedules Sc4 and Sc5 contained in the substitution-doing request on the display unit 35 as a substitution request screen. Further, the job schedule display section 312 displays a button B2 for confirming acceptance to the substitution-doing request in association with each job schedule. The operator of the nurse terminal 30 selects the button B2 through the input unit 34 to notify the job state notifying section 313 such that the operator accepts the substitution-doing for the job schedule. When a cancel button B3 is operated, the job schedule display section 312 clears the substitution-doing request screen displayed on the display unit 35.

As shown in FIG. 5, if any one of the job schedules contained in the execution target candidate is selected, then the job state notifying section 313 sends an execution notice containing information specifying the selected job schedule to the job supporting server 10. For example, if a job schedule Sc1 is selected from the job schedules Sc1-Sc3 shown in FIG. 6, then an execution notice containing information specifying the job schedule Sc1 is sent to the job supporting server 10.

Further, if the acceptance to the substitution-doing request against any one of the job schedules contained in the substitution-doing request is selected, then the job state notifying section 313 sends the execution notice containing information specifying the selected job schedule to the job supporting server 10. For example, if 'acceptance to substitution-doing request' button (button B2) against the job schedule Sc4 shown in FIG. 7 is selected, then an execution notice containing information specifying the job schedule Sc4 is sent to the job supporting server 10.

Further, if an end of the work to the job schedule subject to the execution target is input through the input unit 34, then the job state notifying section 313 sends an ending notice containing information specifying the job schedule to the job supporting server 10. Here, a job end indication screen, which is not shown in the accompanying drawings, may display a job end indication button in association with the job schedules shown in FIG. 6 and FIG. 7.

The job substitution candidate acquisition section 314 acquires a job substitution-doing candidate notified from the job supporting server 10. The job substitution candidate display section 315 displays, on the display unit 35, the job schedule contained in the job substitution-doing candidate acquired by the job schedule acquisition section 311.

Figure 8:
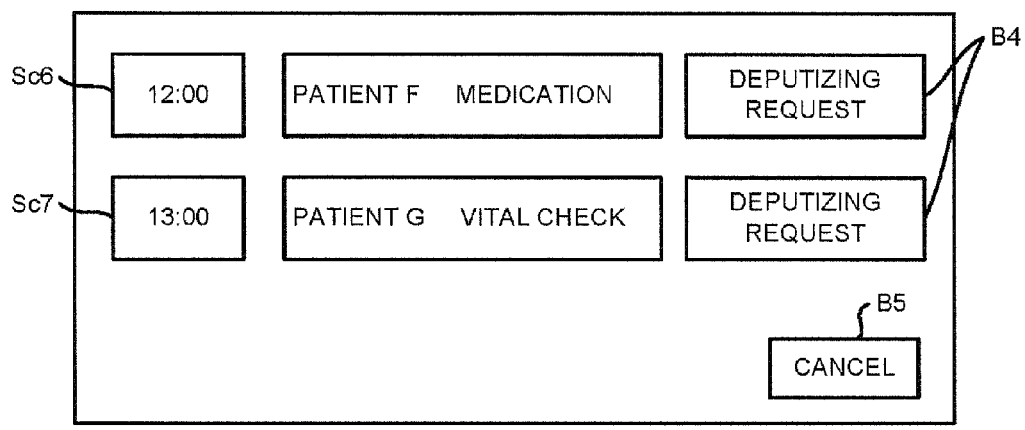
FIG. 8 is a diagram illustrating an example of a job substitution candidate screen displayed on the display section of the nurse terminal.

FIG. 8 is a diagram illustrating an example of a job substitution candidate screen displayed on the display unit 35 of the nurse terminal 30. As shown in FIG. 8, the job substitution candidate display section 315 displays the job schedules Sc6 and Sc7 contained in the job substitution-doing candidate as a job substitution candidate screen. Moreover, the job substitution candidate display section 315 displays a button for requesting the substitution-doing for the job schedule in association with each job schedule. The operator of the nurse terminal 30 selects the button B4 through the input unit 34 to notify the job state notifying section 313 of the substitution-doing request for the job schedule. If a cancel button B5 is operated, the job substitution candidate display section 315 clears the job substitution request screen displayed on the display unit 35.

As shown in FIG. 5, if a job schedule subject to the substitution target is selected from the job schedules contained in a job substitution-doing candidate, then the job state notifying section 313 sends the substitution-doing request containing information specifying the selected job schedule to the job supporting server 10. For example, if a job schedule Sc6 is selected from the job schedules Sc6 and Sc7 shown in FIG. 8, then the substitution-doing request containing information specifying the selected job schedule Sc6 is sent to the job supporting server 10.

Operations of the nurse job supporting system 1 with the structure above are described below. The transfer of an execution target candidate between the job supporting server 10 and the nurse terminal 30 is described with reference to FIG. 9.

Figure 9:
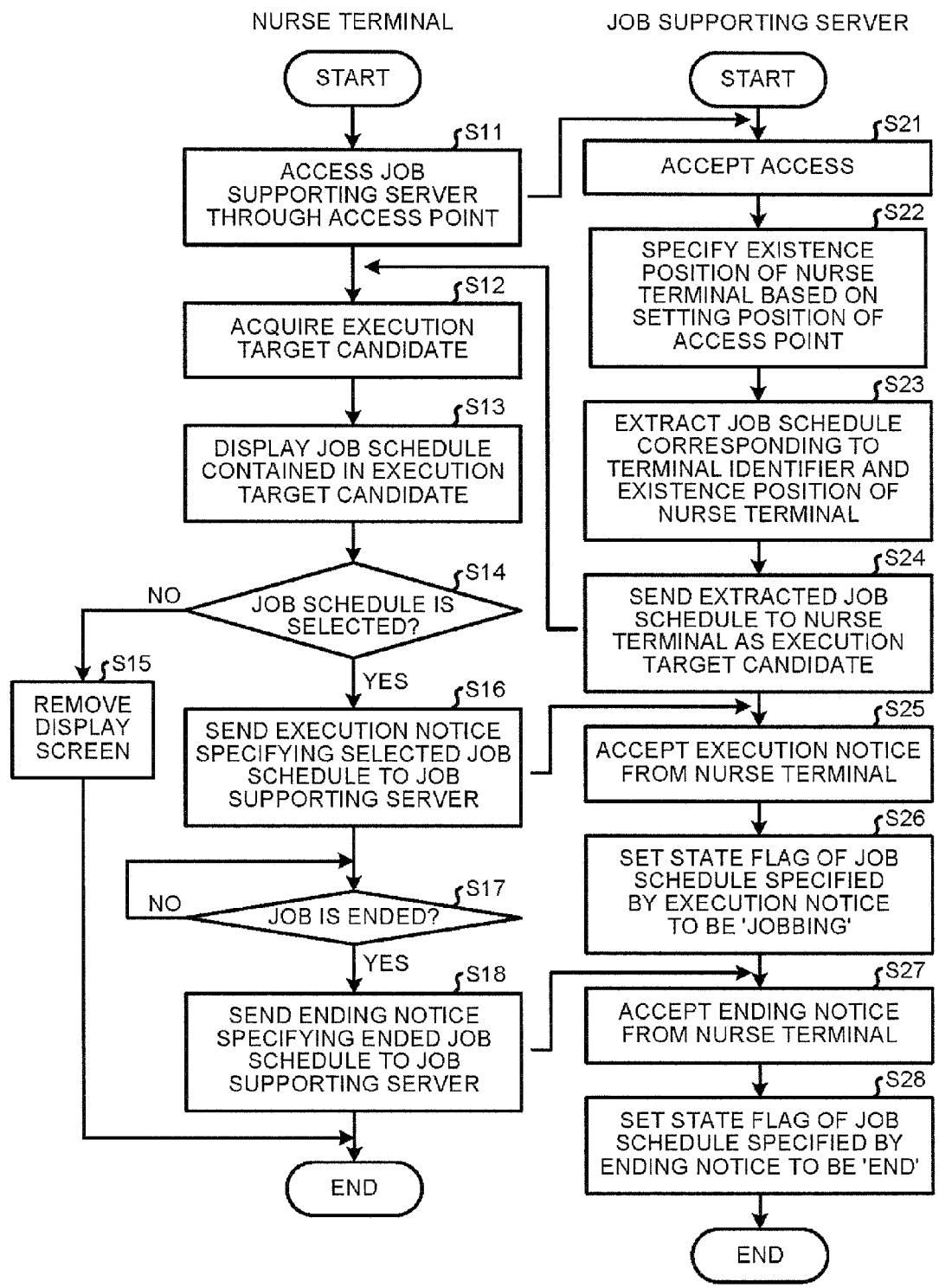
FIG. 9 is a flowchart showing procedures of the transfer of an execution target candidate between the job supporting server and the nurse terminal.

FIG. 9 is a flowchart showing the procedures of the transfer of an execution target candidate between the job supporting server 10 and the nurse terminal 30. First, if the communication with the access point 20 arranged nearby the nurse terminal 30 is established, then the nurse terminal 30 accesses the job supporting server 10 through the access point 20 (ACT S11).

If the job supporting server 10 accepts the access from the nurse terminal 30 (ACT S21), then the position specifying section 111 specifies the position of the nurse terminal 30 based on an arrangement position associated with the AP identifier of the access point 20 used by the nurse terminal 30 (ACT S22). Then, the job schedule notifying section 112 extracts, from the job schedule management file 162, a job schedule corresponding to the terminal identifier of the nurse terminal 30 accessing to the job supporting server and the position of the nurse terminal 30 specified in ACT S22 (ACT S23). Next, the job schedule notifying section 112 notifies the job schedule extracted in ACT S23 to the nurse terminal 30 as an execution target candidate (ACT S24).

In the nurse terminal 30, the job schedule acquisition section 311 acquires the execution target candidate notified from the nurse terminal 30 (ACT S12). Next, the job schedule display section 312 displays, on the display unit 35, the job schedule contained in the execution target candidate acquired in ACT S12 (ACT S13)

The job state notifying section 313 determines whether or not a job schedule is selected from the job schedules contained in the execution target candidate as an execution target (ACT S14). If a cancel button is selected and thus no job schedule is selected, (No in ACT S14), the job state notifying section 313 clears the execution target candidate screen displayed on the display unit 35 (ACT S15), and the processing is ended.

Moreover, if a job schedule is selected as an execution target in ACT S14 (Yes in ACT S14), the job state notifying section 313 sends an execution notice containing information designating the job schedule to the job supporting server 10 (ACT S16). Next, the job state notifying section 313 enters into a standby state until the end of work of the job schedule selected as the execution target is instructed through the input unit 34 (No in ACT S17). If the end of work is instructed (Yes in ACT S17), then the job state notifying section 313 sends an ending notice containing information designating the job schedule the work of which is ended to the job supporting server 10 (ACT S18).

On the other hand, if the job schedule management section 113 of the job supporting server 10 receives the execution notice from the nurse terminal 30 (ACT S25), then the job schedule managing section 113 sets the state flag of the job schedule designated by the execution notice to 'Working', and registers the nurse identifier associated with the terminal identifier of the nurse terminal 30 in the column 'operator' at the same time (ACT S26). Moreover, if the job schedule management section 113 receives the ending notice from the nurse terminal 30 (ACT S27), the job schedule management section 113 sets the state flag of the job schedule designated by the ending notice to 'End' (ACT S28), and then ends the processing.

The job schedule relating to the position of a nurse is notified to the nurse terminal 30 of the nurse through the processing described above, so that the nurse can confirm the job content that is scheduled to be executed at the position and execute it, thereby improving convenience.

Next, the transfer of a job substitution-doing candidate between the job supporting server 10 and the nurse terminal 30 is described with reference to FIG. 10.

Figure 10:
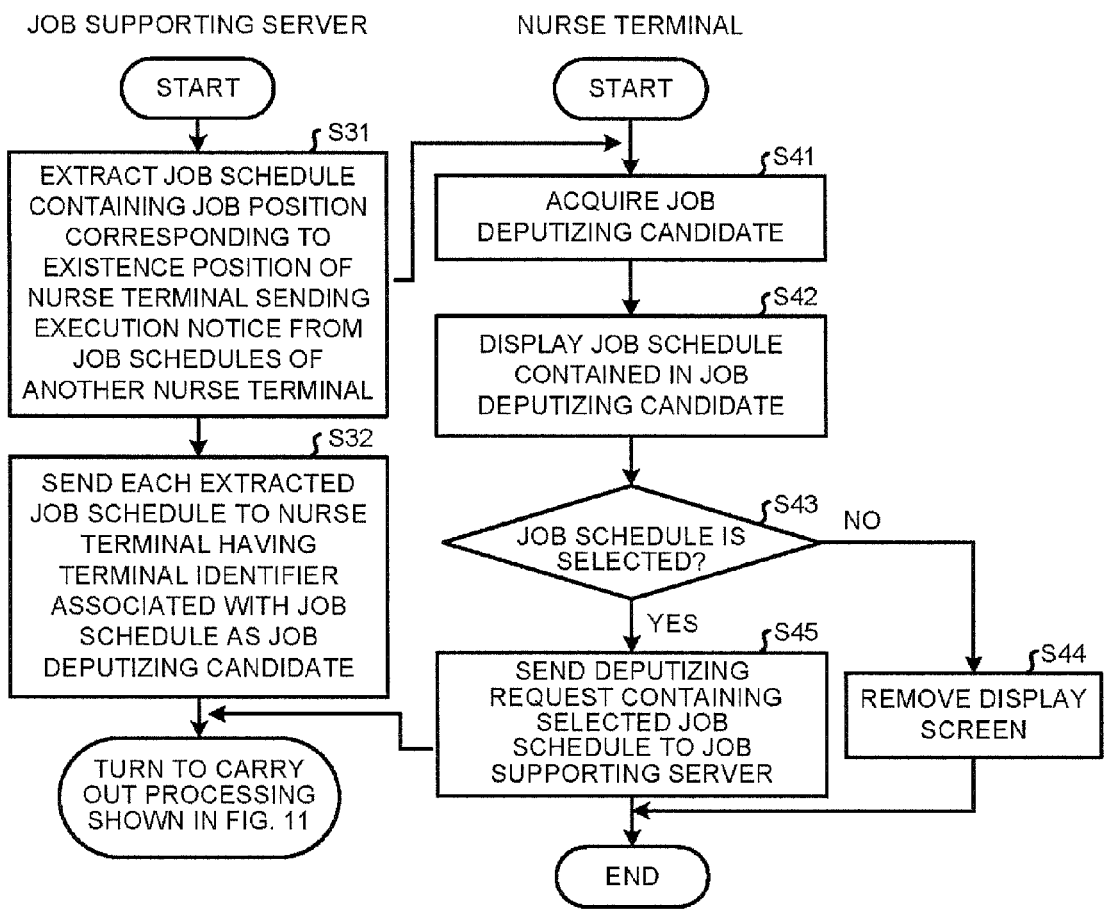
FIG. 10 is a flowchart showing procedures of the transfer of a job substitution-doing candidate between the job supporting server and the nurse terminal.

FIG. 10 is a flowchart showing the procedures of the transfer of a job substitution-doing candidate between the job supporting server 10 and the nurse terminal 30. As a premise that this processing is carried out, the nurse terminal 30 sending an execution notice exists at any position around the position at which the access point 20 is arranged.

First, in the job support terminal 10, the substitution processing section 114 extracts, from the job schedules associated with the terminal identifier of another nurse terminal 30 different from a nurse terminal 30, a job schedule containing a work position corresponding to the position of the nurse terminal 30 sending the execution notice (ACT S31). Next, the substitution processing section 114 notifies (sends) each job schedule extracted in ACT S31 as a job substitution-doing candidate to the nurse terminal 30 having a terminal identifier associated with the job schedule which is sent or notified (ACT S32).

On the other hand, in the nurse terminal 30, the job substitution candidate acquisition section 314 acquires a job substitution-doing candidate notified from the job supporting server 10 (ACT S41). Next, the job substitution candidate display section 315 displays, on the display unit 35, the job schedule contained in the job substitution-doing candidate acquired in ACT S41 (ACT S42).

Sequentially, the substitution request notifying section 316 determines whether or not a job schedule is selected as a substitution target from the job schedules contained in the job substitution-doing candidates (ACT S43). Here, if a cancel button is selected without selecting any one of the job schedules (No in ACT S43), the substitution request notifying section 316 clears the job substitution candidate screen displayed on the display unit 35 (ACT S44), and ends the processing.

Moreover, if a job schedule is selected as an execution target in ACT S43 (Yes in ACT S43), the substitution request notifying section 316 sends a substitution request containing the selected job schedule to the job supporting server 10 (ACT S45), and moves to execute the processing shown in FIG. 12 described later.

Next, the substitution-doing for a job schedule between the job supporting server 10 and the nurse terminal 30 is described with reference to FIG. 11.

Figure 11:
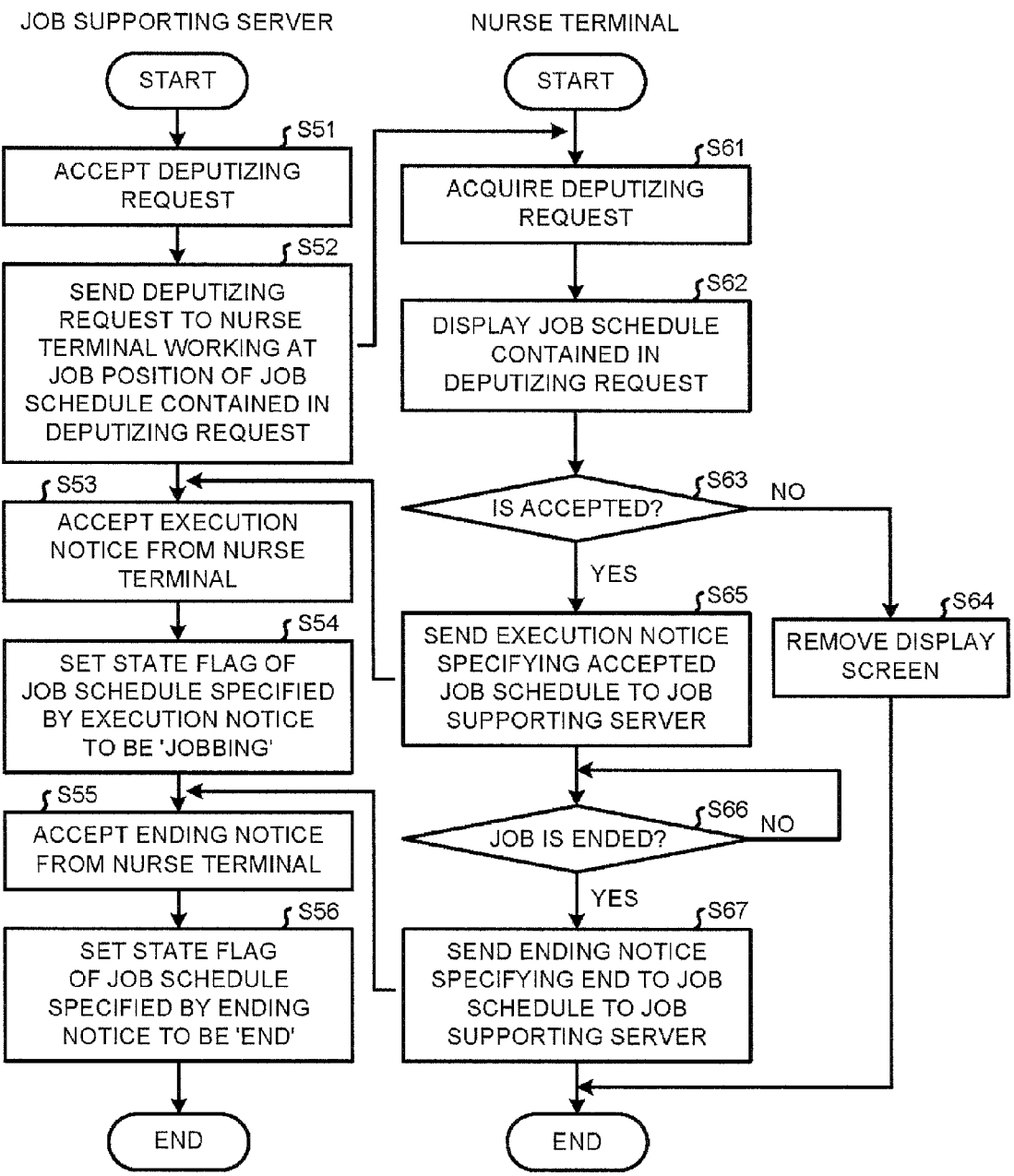
FIG. 11 is a flowchart showing procedures of the transfer of a substitution request between the job supporting server and the nurse terminal.

FIG. 11 is a flow chart showing the procedures of the transfer of a substitution-doing request between the job supporting server 10 and the nurse terminal 30. As a premise that this processing is carried out, a substitution-doing request is sent from any one of the nurse terminals 30 to the job supporting server 10 by the above-described processing shown in FIG. 10.

If the substitution processing section 114 of the job supporting server 10 receives the substitution-doing request from the nurse terminal 30 (ACT S51), the substitution processing section 114 forwards the substitution-doing request to the nurse terminal 30, locating at the work position of the job schedule contained in the substitution-doing request, in which the state flag of the job schedule including the work position is 'Working' (ACT S52).

On the other hand, in the nurse terminal 30 that is a destination of transmission of the substitution-doing request, the job schedule acquisition section 311 acquires the substitution-doing request notified from another nurse terminal 30 (ACT S61). Next, the job schedule display section 312 displays, on the display unit 35, the job schedule contained in the substitution-doing request acquired in ACT S61 (ACT S62).

The job state notifying section 313 determines whether or not an acceptance to the substitution-doing request is selected for any one of the job schedules contained in the substitution-doing request (ACT S63). Here, if a cancel button is selected without selecting any job schedule, (No in ACT S63), the job state notifying section 313 clears the substitution request screen displayed on the display unit 35 (ACT S64), and ends the processing.

Moreover, if an acceptance to the substitution-doing request is selected for any job schedule in ACT S63 (Yes in ACT S63), the job state notifying section 313 sends an execution notice containing information specifying the job schedule to the job supporting server 10 (ACT S65). Next, the job state notifying section 313 enters into a standby state until the end of the job schedule that is an execution target is instructed (No in ACT S66). If the end of the job is instructed (Yes in ACT S66), then the job state notifying section 313 sends an ending notice containing information specifying the job schedule to the job supporting server 10 (ACT S67).

On the other hand, if the job schedule management section 113 of the job supporting server 10 receives the execution notice from the nurse terminal 30 (ACT S53), then the job schedule managing section 113 sets the state flag of the job schedule specified with the execution notice to 'Working', and registers the nurse identifier associated with the terminal identifier of the nurse terminal 30 in the column 'operator' at the same time (ACT S54). Moreover, if the job schedule management section 113 receives the ending notice from the nurse terminal 30 (ACT S55), the job schedule management section 113 sets the state flag of the job schedule specified with the ending notice to 'End' (ACT S56), and ends the processing.

Through the processing above, the job schedule of another nurse relating to the work position at which one nurse is working is notified to the nurse terminal 30 of the above-described another nurse as a job substitution-doing candidate. Moreover, the nurse who carries the nurse terminal 30 receiving the notice of the job substitution-doing candidate can select the job schedule of which the substitution-doing is requested to the nurse at work while the job schedule contained in the job substitution-doing candidate is confirmed. In this way, job schedules can be shared effectively among nurses to process job schedules efficiently.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms and modifications as would fall within the scope and spirit of the invention.

For example, in the embodiments, the job schedule corresponding to the position of the nurse terminal 30 is extracted from the job schedule management file 162 as an execution target candidate, however, a job starting time may also be contained in an extraction condition. Specifically, in addition to the position of the nurse terminal 30, the job schedule notifying section 112 of the job supporting server 10 may also take a job starting time (a job starting time within one hour before or after the current time, for example) corresponding to the current time measured by an RTC (Real Time Clock) as an extraction condition. Moreover, the same extraction condition described above may be used for extracting a job substitution-doing candidate.

For example, in the embodiments, the position of each nurse terminal 30 is specified using an access point 20, however, the method for specifying the position of the nurse terminal is not limited to this. For example, an RIFD reader may be set everywhere in a hospital so that the position of the nurse terminal 30 can be specified according to the arrangement position of the RFID reader reading an RFID tag attached to the nurse terminal 30. Moreover, if the nurse terminal 30 is provided with a position detection unit such as a GPS, the position information detected by the position detection unit is sent to the job supporting server 10 from the nurse terminal 30, thereby specifying the position of the nurse terminal 30 based on the position information.

Further, in the embodiments, a substitution-doing request is sent to the nurse terminal 30 (nurse) working at the work position of the job schedule contained in the substitution-doing request, however, the substitution-doing request may be sent to the nurse terminal 30 at the work position of the job schedule contained in the substitution-doing request, no matter whether the nurse is working or not.

What is claimed is:

1. A job supporting apparatus, comprising:
   a management section configured to manage a job schedule, containing a predetermined job content to be carried out by a person in charge and a work position where the job content is performed, that is associated with respective portable terminal carried by each person in charge;
   a position specifying section configured to determine a location of a portable terminal as a function of an arrangement position associated with an access point device;
   a first extracting section configured to extract a job schedule containing a work position corresponding to the location of the portable terminal specified by the position specifying section from the job schedules associated with the portable terminals;
   a first notifying section configured to notify the job schedule extracted by the first extracting section to a portable terminal associated with the extracted job schedule; and
   a second extracting section configured to extract a job schedule containing a work position corresponding to the location of the portable terminal specified by the position specifying section from the job schedules associated with another portable terminal different from the specified portable terminal;
   a second notifying section configured to notify the job schedule extracted by the second extracting section to the another portable terminal associated with the job schedule extracted;
   a first acceptance section configured to receive from the another portable terminal designation on a job schedule, as a substitution-doing candidate, within the job schedules notified to the another portable terminal by the second notifying section; and a substitution request section configured to request the substitution-doing of the job schedule designation of which is received by the first acceptance section to the portable terminal specified by the position specifying section.

2. The job supporting apparatus according to claim 1, further comprising:

a second acceptance section configured to receive from the portable terminal that receives the notification designation on a job schedule, as an execution target, within the job schedules notified to the portable terminal by the first notifying section, and a state management section configured to manage the job state of the job schedule, as a working, the designation of which is received by the second acceptance section.

3. A portable terminal carried by each parson in charge, comprising:

a first acquisition section configured to acquire a job schedule for a self-portable terminal containing a work position corresponding to a location of the self-portable terminal including the first acquisition section from a job supporting apparatus which manages a job schedule, containing a predetermined job content to be carried out by a person in charge who carries the portable terminal and a work position where the job content is executed, that is associated with each portable terminal, wherein the location of the self-portable terminal is determined as a function of an arrangement position associated with an access point device;

a second acquisition section configured to acquire a job schedule requested a substitution-doing by another portable terminal of the job schedule of a job schedule for the another portable terminal containing a work position corresponding to the location of the self-portable terminal from the job supporting apparatus; and a display section configured to display the job schedule acquired by the first acquisition section and the second acquisition section on a display section.

4. The portable terminal according to claim 3, comprising:

an acceptance section configured to receive the designation on a job schedule, as an execution target, within the job schedule displayed on the display section; and a notifying section configured to notify the job supporting apparatus of the job schedule received by the acceptance section as an execution target so that the job supporting apparatus manages the job state of the notified job schedule as a working.

5. A job supporting method, including:

managing, by a device comprising a processor, a job schedule, containing a predetermined job content to be carried out by a person in charge and a work position where the job content is carried out by the person in charge, that is associated with a portable terminal carried by each person in charge;

determining, by the device, the position of the portable terminal as a function of an arrangement position associated with an access point device;

extracting, by the device, a job schedule containing a work position corresponding to the specified location of the portable terminal from the job schedules associated with the portable terminals;

notifying, by the device, the extracted job schedule to the portable terminal associated with the extracted job schedule;

extracting, by the device, a job schedule containing a work position corresponding to the location of the portable terminal specified from the job schedules associated with another portable terminal different from the specified portable terminal;

notifying, by the device, the extracted job schedule to the another portable terminal associated with the job schedule extracted;

receiving, by the device, from the another portable terminal designation on a job schedule, as a substitution-doing candidate, within the job schedules notified to the another portable terminal; and requesting, by the device, the substitution-doing of the job schedule designation of which is received to the specified portable terminal.

* * * * *